(12) United States Patent
Tsai

(10) Patent No.: US 8,824,778 B2
(45) Date of Patent: Sep. 2, 2014

(54) SYSTEMS AND METHODS FOR DEPTH MAP GENERATION

(75) Inventor: Pei-Jen Tsai, Taichung (TW)

(73) Assignee: Cyberlink Corp., Taipei (TW)

( * ) Notice: Subject to any disclaimer, the term of this patent is extended or adjusted under 35 U.S.C. 154(b) by 418 days.

(21) Appl. No.: 13/349,888

(22) Filed: Jan. 13, 2012

(65) Prior Publication Data
US 2013/0182943 A1    Jul. 18, 2013

(51) Int. Cl.
*G06K 9/00* (2006.01)
*G06K 9/34* (2006.01)

(52) U.S. Cl.
USPC .......................... 382/154; 382/106; 382/164

(58) Field of Classification Search
USPC ......................................... 382/106, 154, 164
See application file for complete search history.

(56) References Cited

U.S. PATENT DOCUMENTS

| | | | |
|---|---|---|---|
| 8,265,418 B2 * | 9/2012 | Gomi et al. .................... | 382/274 |
| 2007/0024614 A1 | 2/2007 | Tam et al. | |
| 2008/0247670 A1 | 10/2008 | Tam et al. | |
| 2010/0073521 A1 * | 3/2010 | Gomi et al. .................... | 348/235 |
| 2010/0129048 A1 * | 5/2010 | Pitts et al. .................... | 386/52 |
| 2010/0141757 A1 | 6/2010 | Baik et al. | |
| 2010/0246938 A1 | 9/2010 | Shao et al. | |
| 2011/0064299 A1 * | 3/2011 | Zhang et al. .................... | 382/154 |
| 2011/0096832 A1 * | 4/2011 | Zhang et al. .................... | 375/240.08 |
| 2012/0219236 A1 * | 8/2012 | Ali et al. .................... | 382/276 |
| 2012/0294590 A1 * | 11/2012 | Pitts et al. .................... | 386/282 |

OTHER PUBLICATIONS

Tsai, et al., "A Real-Time 1080p 2D-to-3D Video Conversion System", IEEE.
Pol, et al., "Semi-Automatic Figure-Ground Segmentation for 2D-to-3D Image Conversion based on Color and Compactness", Technical note TN-2009-00408.

* cited by examiner

*Primary Examiner* — Kathleen Y Dulaney
(74) *Attorney, Agent, or Firm* — McClure, Qualey & Rodack, LLP

(57) ABSTRACT

Various embodiments are disclosed for generating depth maps. One embodiment is a method implemented in an image processing device. The method comprises retrieving, by the image processing device, a (2D) image; and determining, by the image processing device, at least one region within the (2D) image having a high gradient characteristic relative to other regions within the (2D) image. The method further comprises identifying, by the image processing device, an out-of-focus region based on the at least one region having a high gradient characteristic; and deriving, by the image processing device, a color model according to the out-of-focus region. Based on the color model, the image processing device provides a depth map for (2D)-to-stereoscopic conversion.

29 Claims, 15 Drawing Sheets
(5 of 15 Drawing Sheet(s) Filed in Color)

SYSTEMS AND METHODS FOR DEPTH MAP GENERATION

BACKGROUND

Stereoscopic systems are designed to duplicate real-world experiences by providing each eye with a unique version of the image. By displaying a separate image for each eye, a stereoscopic effect is achieved. For example, objects in a stereoscopic image may appear to be in front of or behind the screen. To view a stereoscopic image, the display system may include a corresponding pair of stereoscopic glasses that ensures that the left eye only sees the image meant for the left eye, and so on for the right eye. In this regard, stereoscopic images create the illusion of depth to individuals by providing a sub-view for each eye. A number of different technologies exist that are designed to accomplish this, and each technology has its own benefits, drawbacks, and costs. As stereoscopic media content gains increasing popularity, more devices are becoming available for converting 2D images to stereoscopic images.

SUMMARY

Briefly described, one embodiment, among others, is a method implemented in an image processing device for performing two-dimensional (2D) to stereoscopic conversion. The method comprises retrieving, by the image processing device, a 2D image; and determining, by the image processing device, at least one region within the 2D image having a high gradient characteristic relative to other regions within the 2D image. The method further comprises identifying, by the image processing device, an out-of-focus region based on the at least one region having a high gradient characteristic; and deriving, by the image processing device, a color model according to the out-of-focus region. Based on the color model, the image processing device provides a depth map for 2D-to-stereoscopic conversion.

Another embodiment is a method that comprises retrieving, by an image processing device, a 2D image; and determining, by the image processing device, at least one high gradient region within the 2D image having a high gradient characteristic relative to other regions within the 2D image, wherein the at least one high gradient region includes at least one of: a high frequency region, a high variance region, a high texture region, and a high detail region. The method further comprises forming an expanded region around each of the at least one high gradient region; identifying, by the image processing device, an out-of-focus region within the 2D image from among regions other than the at least one expanded region; and deriving, by the image processing device, a color model according to the out-of-focus region. Based on the color model, the image processing device provides a depth map for 2D-to-stereoscopic conversion.

Another embodiment is a system for generating a depth map for two-dimensional (2D) to stereoscopic conversion comprising an image processing device and an application executable in the image processing device. The application comprises logic that retrieves a 2D image; logic that determines at least one high gradient region within the 2D image relative to other regions within the 2D image; logic that determines an out-of-focus region within the 2D image based on the at least one high gradient region; logic that derives a color model according to the out-of-focus region; and logic that provides a depth map based on the color model.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
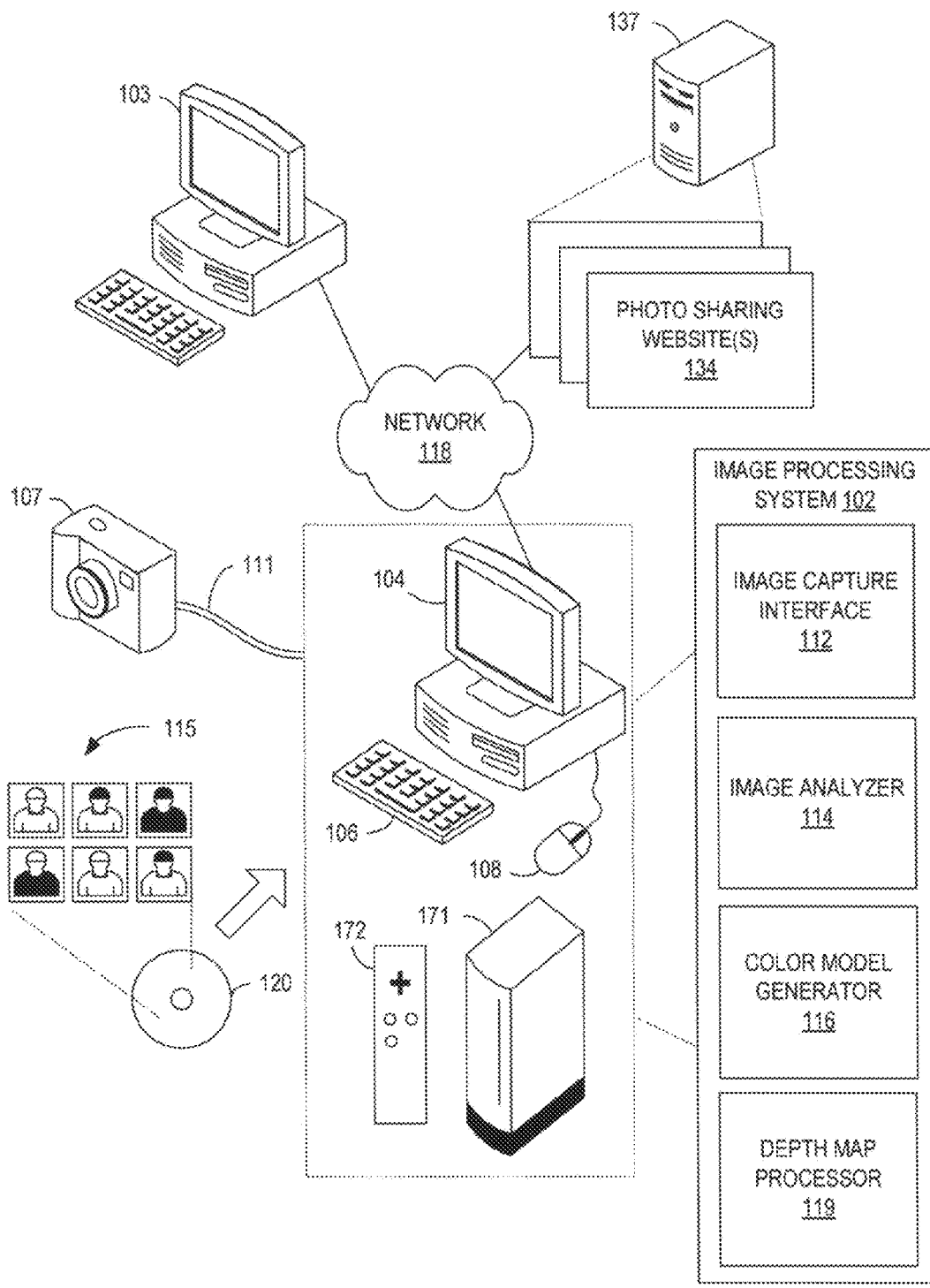
FIG. 1 is a block diagram of an image processing system in which embodiments of generating a depth map as described below may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In recent years, the conversion of two-dimensional (2D) images to stereoscopic images has become increasingly popular, particularly with applications involving stereoscopic video playback. Generating a pair of stereo images from a single image typically involves deriving a depth map by analyzing the content of the image, where the depth map represents the relative position of each pixel in the stereoscopic domain. Specifically, a depth map value is assigned to each object. Thus, stereoscopic conversion may be performed by applying a depth map to a 2D image.

As those skilled in the art will appreciate, however, a bottleneck in 2D-to-stereoscopiccon version process lies in the depth map generation process as this is typically a computationally intensive process. Furthermore, in some cases, artifacts may be introduced during the conversion process, thereby affecting the viewing experience of the viewer. While the use of high-focus regions for deriving depth maps is generally known, high-focus regions can be difficult to accurately identify, particularly for more complex images with a high level of detail. In accordance with exemplary embodiments, an "out-of-focus" region is utilized for assigning depth map values. As described in more detail below, the "out-of-focus" region may refer to multiple areas within the image that are not necessarily contiguous. The out-of-focus region generally refers to the one or more region outside the high gradient regions.

A description of a system for generating depth maps is now described followed by a discussion of the operation of the components within the system. Note that while the embodiments disclosed herein are described in the context of image conversion, the embodiments described herein may also be applied to video conversion. FIG. 1 is a block diagram of an image processing system 102 in which embodiments of the image processing techniques disclosed herein may be implemented. The image processing system 102 may be embodied, for example, as a desktop computer, computer workstation, laptop, or other computing platform and includes a display 104 and input devices such as a keyboard 106 and a mouse 108.

In other embodiments, the image processing system 102 may be embodied as a video gaming console 171, which includes a video game controller 172 for receiving user preferences. For such embodiments, the video gaming console 171 may be connected to a television (not shown) or other display.

The image processing system 102 is configured to retrieve, via the image capture interface 112, digital images 115 stored on a storage medium 120 such as by way of example and without limitation, a compact disc (CD) or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files.

As depicted in FIG. 1, the image capture interface 112 in the image processing system 102 may be configured to retrieve digital images 115 directly from a digital camera 107 where a cable 111 or some other interface may be used for coupling the digital camera 107 to the image processing system 102. The image processing system 102 may support any one of a number of common computer interfaces, such as, but not limited to IEEE-1394 High Performance Serial Bus (Firewire), USB, a serial connection, and a parallel connection.

The digital camera 107 may also be coupled to the image processing system 102 over a wireless connection or other communication path. The image processing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image processing system 102 may receive digital images 115 from another computing system 103. Alternatively, the image processing system 102 may access one or more photo sharing websites 134 (e.g., Picasa from Google, Flickr®) hosted on a server 137 via the network 118 to retrieve digital images 115.

The image analyzer 114 in the image processing system 102 is configured to analyze gradient characteristics of regions within the retrieved images 115 and identify high gradient regions. Based on the one or more high gradient regions that are identified, an out-of-focus region is identified within the digital images 115. The color model generator 116 is configured to analyze the out-of-focus region and determine the color spectrum of the out-of-focusregion. Note that for purposes of this disclosure, the "out-of-focus" region may refer to multiple areas within the image that are not necessarily contiguous. The out-of-focus region generally refers to the one or more region outside the high gradient regions.

For some embodiments, the color spectrum may relate to information in the RGB color space. The color spectrum may also relate to information in other color spaces, including, but not limited to, YCbCr, CIExyY, CIELAB, and so on. Based on the color spectrum, a color model is generated whereby the color model may comprise all or a subset of the colors within the out-of-focus region. For implementations where only a subset of the colors are used, a predetermined number of predominant colors may be selected for the color model.

For other implementations, all the colors within the out-of-focus region may be selected for generating the color model. The depth map processor 119 is configured to compare each pixel in the digital images 115 to the color model and assign a depth map value associated with the digital image 115. In this regard, one embodiment, among others, is a method for generating a depth map implemented in the image processing system 102. The method comprises retrieving a 2D image 115; and determining, by the image processing device, a high gradient region within the 2D image 115 having a high gradient characteristic relative to other regions within the 2D image 115. The method further comprises identifying an out-of-focus region within the 2D image 115 from among regions other than the high gradient region; and deriving a color model according to the out-of-focus region. Based on the color model, the image processing system 102 provides a depth map for 2D-to-stereoscopic conversion.

Figure 2:
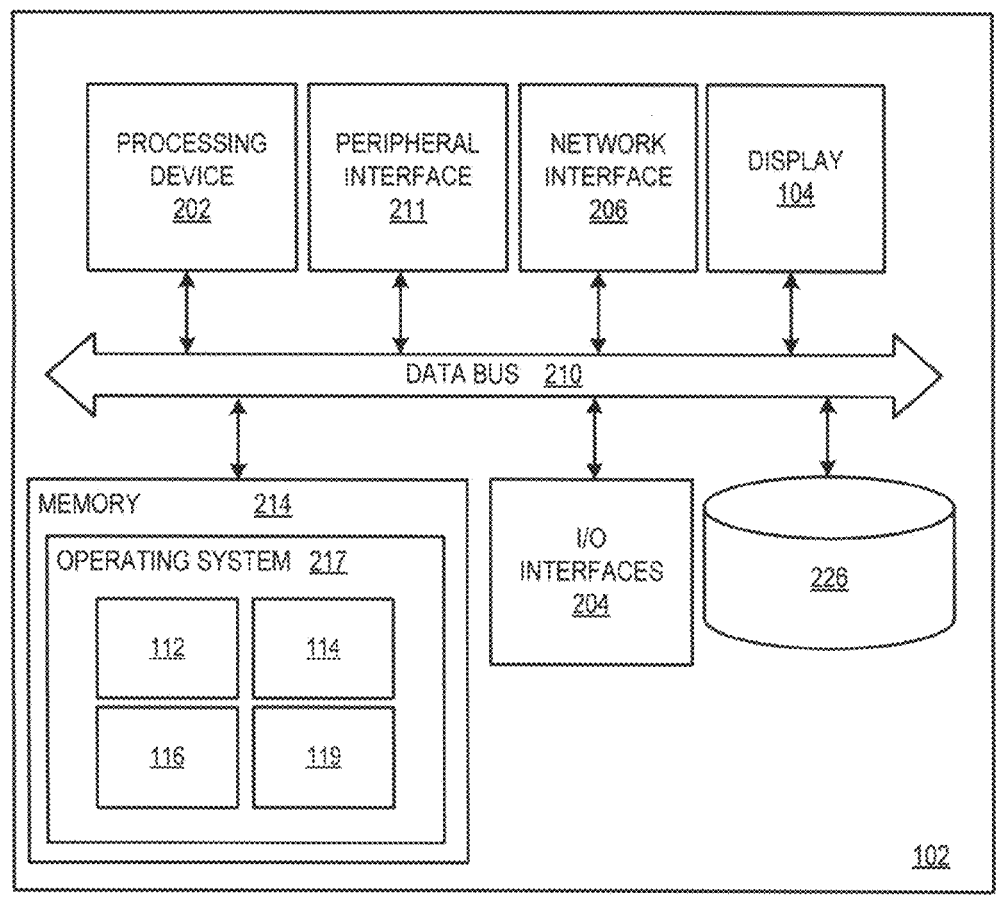
FIG. 2 is a schematic diagram of the image processing system shown in FIG. 1.

FIG. 2 is a schematic diagram of the image processing system 102 shown in FIG. 1. The image processing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the image processing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image processing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, andSRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (image capture interface 112, image analyzer 114, color model generator 116, depth map processor 119) of the image processing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image processing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-onlymemory (CDROM) (optical).

With further reference to FIG. 2, network interface 206 comprise svarious components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image processing system 102 may communicate with one or more computing devices via the network interface 206 over the network 118 (FIG. 1). The image processing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
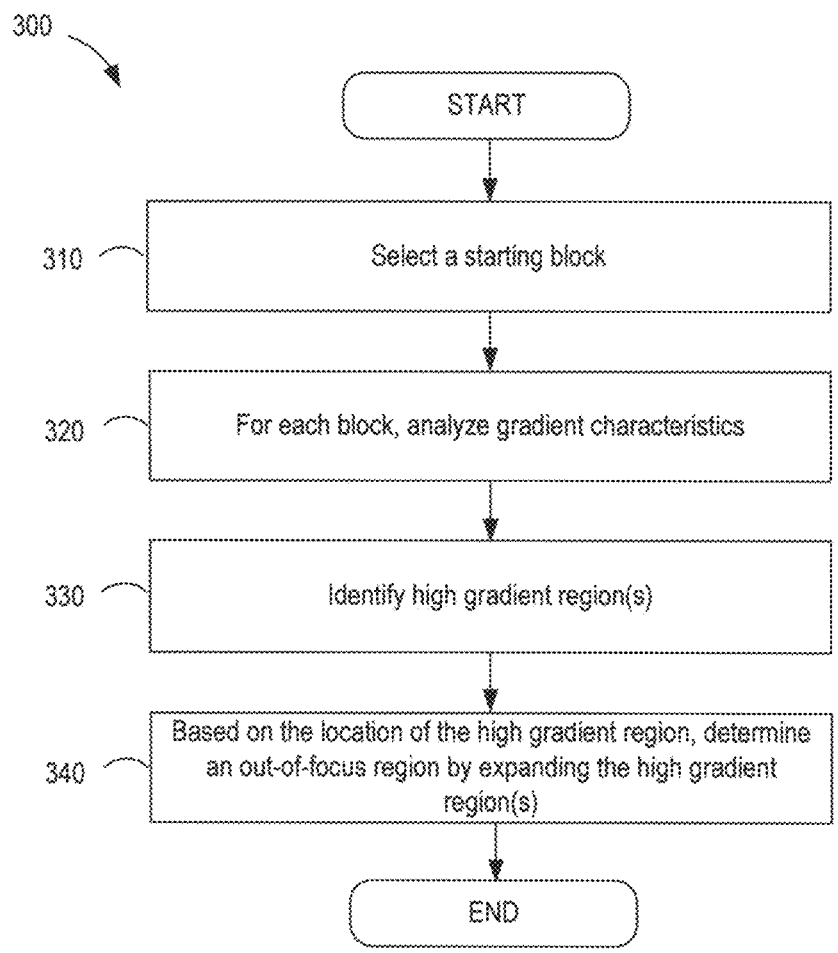
FIG. 3 illustrates an example of functionality implemented in the image analyzer in the image processing system of FIG. 1 according to an embodiment of the present disclosure.

Reference is made to FIG. 3, which is a flowchart 300 in accordance with one embodiment for depth map generation. It is understood that the flowchart 300 of FIG. 3 provides merely an example of the many different types of functional arrangements that may be employed to implement the operation of the image analyzer 114 (FIG. 1) in the image processing system 102 (FIG. 1). As an alternative, the flowchart of FIG. 3 may be viewed as depicting an example of steps of a method implemented in the image processing system 102 according to one or more embodiments.

The image capture device 112 (FIG. 1) in the image processing system 102 retrieves a 2D digital image 115 to be converted to a stereoscopic image. As described above, the digital image 115 may be retrieved from a storage medium 120 or via the network 118 (FIG. 1). The image capture interface 112 then routes the digital image 115 to the image analyzer 114 for processing. The operation of the image analyzer 114 is now described.

Beginning with block 310, the image analyzer 114 selects a starting block or region within the image 115 (FIG. 1) retrieved by the image capture interface 112 for purposes of identifying high gradient regions associated with front objects, which are the focal point of the image 115. This allows background objects to also be identified. For some embodiments, the starting region comprises a N-by-N pixel block. In block 320, the image analyzer 114 analyzes characteristics of each region where such gradient characteristics include, but are not limited to, depth information, motion, texture, level of detail, luminance, contrast, color, etc. In accordance with some embodiments, the analysis is performed on a block level where blocks over lap. To illustrate, consider an $N^{th}$ block that is analyzed. The image analyzer 114 may shift the $N^{th}$ block by a predetermined amount (e.g., one pixel) and analyze the $(N+1)^{th}$ block, wherein $N^{th}$ block and $(N+1)^{th}$ block may have an overlapped portion.

In block 330, the image analyzer 114 identifies one or more high gradient regions that exhibit a high rate of change with respect to such characteristics as texture, depth, etc. The image analyzer 114 may be configured to determine borders or boundaries where the characteristics rapidly change. To illustrate, reference is made to the image 115 depicted in FIG. 8, which includes a horse 701 as the main, front object. In this non-limiting example, the image analyzer 114 determines that that outline of the horse corresponds to high gradient regions within the image 115 since the image 115 transitions from a high gradient point (i.e., the horse) to background objects. For some embodiments, the image analyzer 114 identifies the region with the highest gradient region relative to all the regions in the image 115. In block 340, the image analyzer 114 then determines the location of an out-of-focus region based on the location of the high (or highest) gradient region within the image 115.

Figure 8:
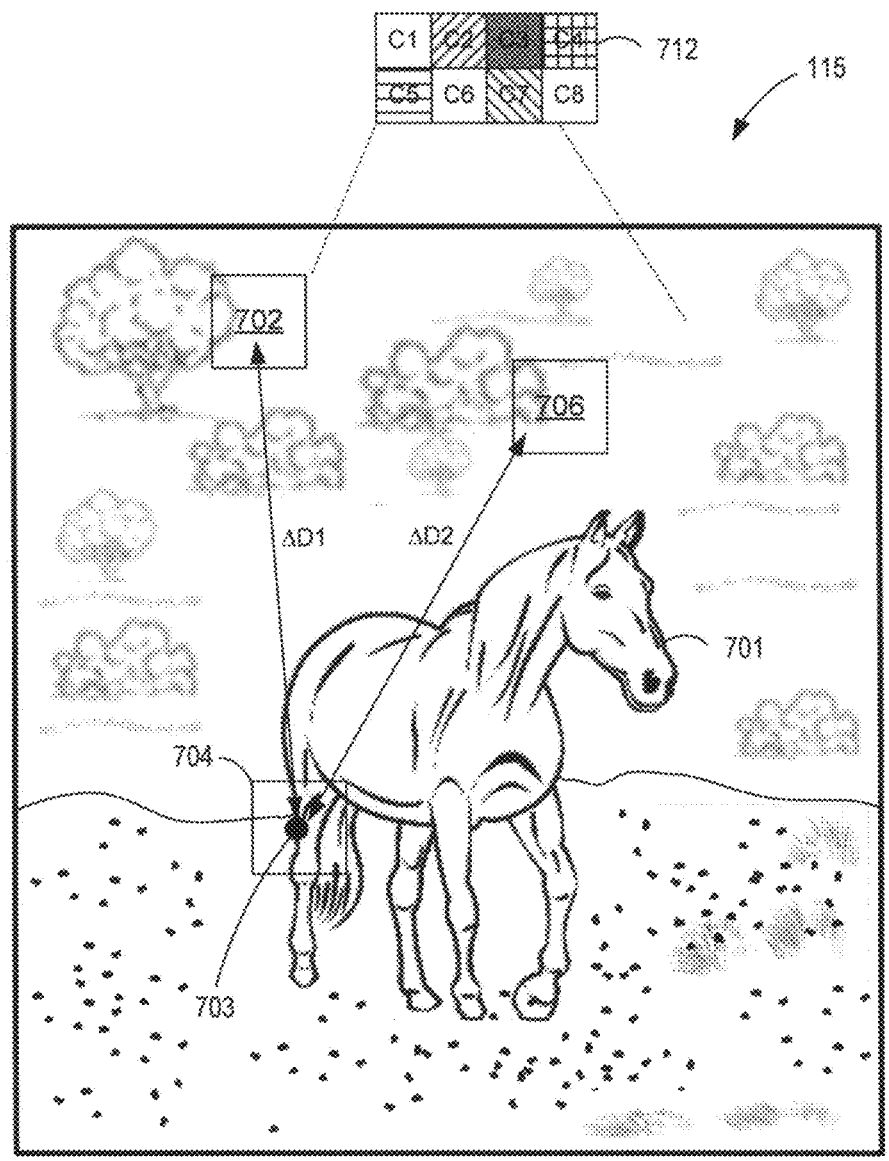
FIGS. 8 and 9 illustrate in-focus and out-of-focus regions within simplified sample images.

With further reference to FIG. 8, the sample image 115 includes various regions 702, 704, 706. As region 704 is in an area where the image 115 transitions from the horse 701 to background objects, the image analyzer 114 determines that this is a region 704 with high gradient characteristics. For some embodiments, the region 704 represents an expanded region around point 703, which is a high gradient point. As described in more detail below, an X-by-Y pixel block may be formed around the high gradient point 703 to form the expanded high gradient region 704, where the X-by-Y pixel block represents a buffer area around the high gradient point 703.

In accordance with some embodiments, the size of each expanded high gradient region may vary within the same 2D image and is not limited to a fixed size. For some embodiments, the size of the expanded region may vary according to values quantifying corresponding high gradient characteristics relied upon for identifying high gradient regions. For example, if the high gradient characteristic has a higher value (e.g., a higher degree of texture, higher contrast, sharper edge(s), etc.), it is generally easier to differentiate between the focus and out-of-focus regions. Therefore, a smaller expanded region may be utilized for points having a high value. As a non-limiting example, a point having the color scarlet may have a higher value, whereas a point having the color baby pink may have a lower value.

In this regard, forming an expanded region around each region having the high gradient characteristic may be performed according to an inverse relationship between the size of the expanded region and the value quantifying a corresponding high gradient characteristic associated with each region having the high gradient characteristic. For example, a higher value associated with the high gradient characteristic may result in a smaller expanded region being formed and vice versa.

Assume now that the image analyzer 114 identifies two regions 702, 706, which do not include the expanded high gradient region 704. These are regions 702, 706 that exhibit relatively low gradient characteristics with respect to the expanded high gradient region 704, and the assumption is made that these regions 702, 706 collectively correspond to an out-of-focus region.

In selecting an out-of-focus region among the various regions 702, 706 (block 340 in FIG. 3) outside the expanded, high gradient region, various criteria may be applied by the image analyzer 114. For some embodiments, the image analyzer 114 may be configured to select an out-of-focus region 702, 706 that is at least a minimum distance from the expanded high gradient region 704. If multiple regions meet the minimum distance criteria, then the image analyzer 114 may select the region with the wider color spectrum.

In the illustration, region 702 includes eight colors (denoted as C1 to C8). In accordance with some embodiments, a differential in color values may be utilized. For example, the color value differential between the white and grey colors is smaller than the color value differential between white and black colors, which may be expressed as: Dist(white, gray) <Dist(white, black). In this regard, various differential values (e.g., distance, color value differential) may be utilized to select an out-of-focus region relative to a high gradient region.

Figure 9:
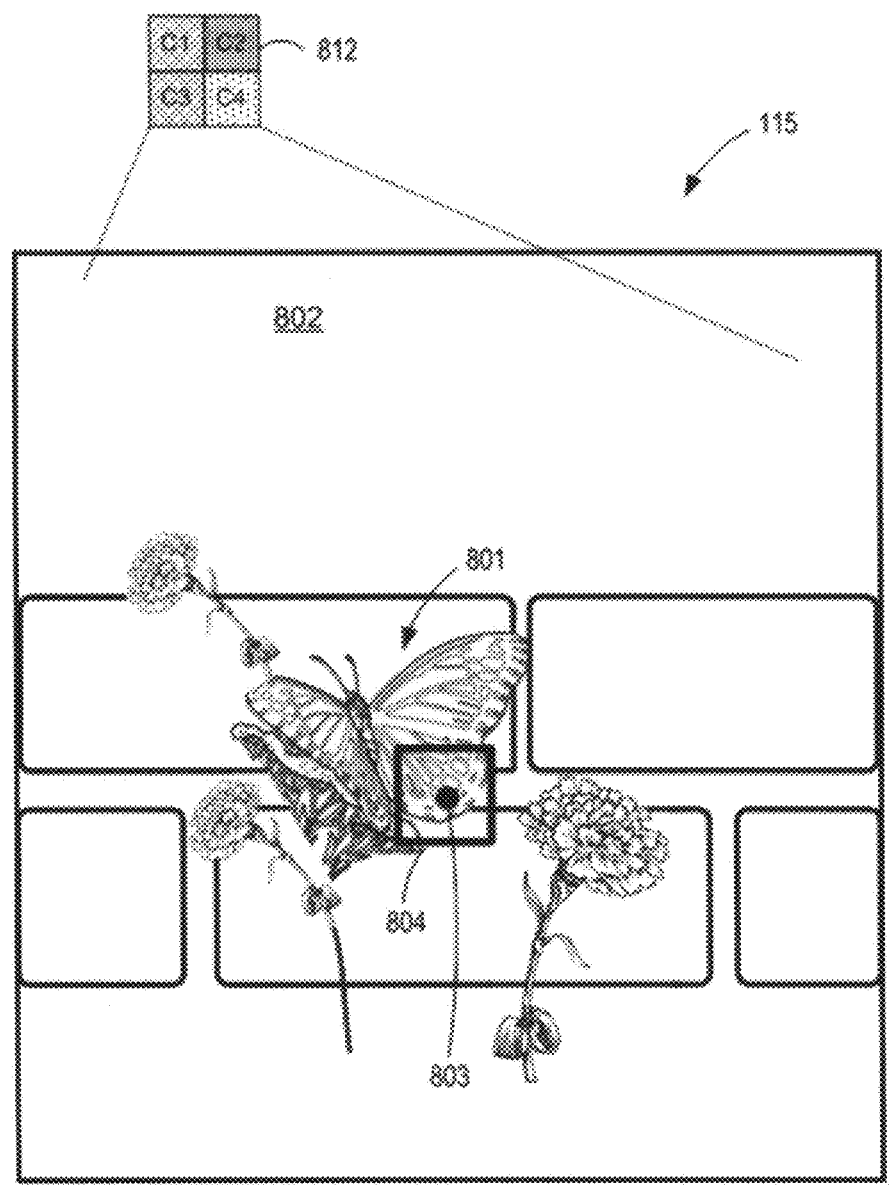

FIG. 9 depicts another sample image 115. The image 115 includes a butterfly object 801, which includes an expanded high gradient region 804 formed around a high gradient point 803. As shown, the image 115 also includes an out-of-focus region 802 in the background of the image 115 determined, for example, based on gradient characteristics. In the illustration, region 802 includes four colors (denoted as C1 to C4). As described below, the color model generator 116 (FIG. 1) generates a color model 812 based on the color spectrum associated with the out-of-focus region 802 determined by the image analyzer 114. Note that the images in FIGS. 8 and 9 represent simplified illustrations involving a single, high gradient point 703, 803. As discussed in connection with FIGS. 10-15 below, an image will typically contain many high gradient points around which expanded high gradient regions are formed.

Figure 7:
FIG. 7 depicts sample images for which depth map information is generated.
Figure 7:
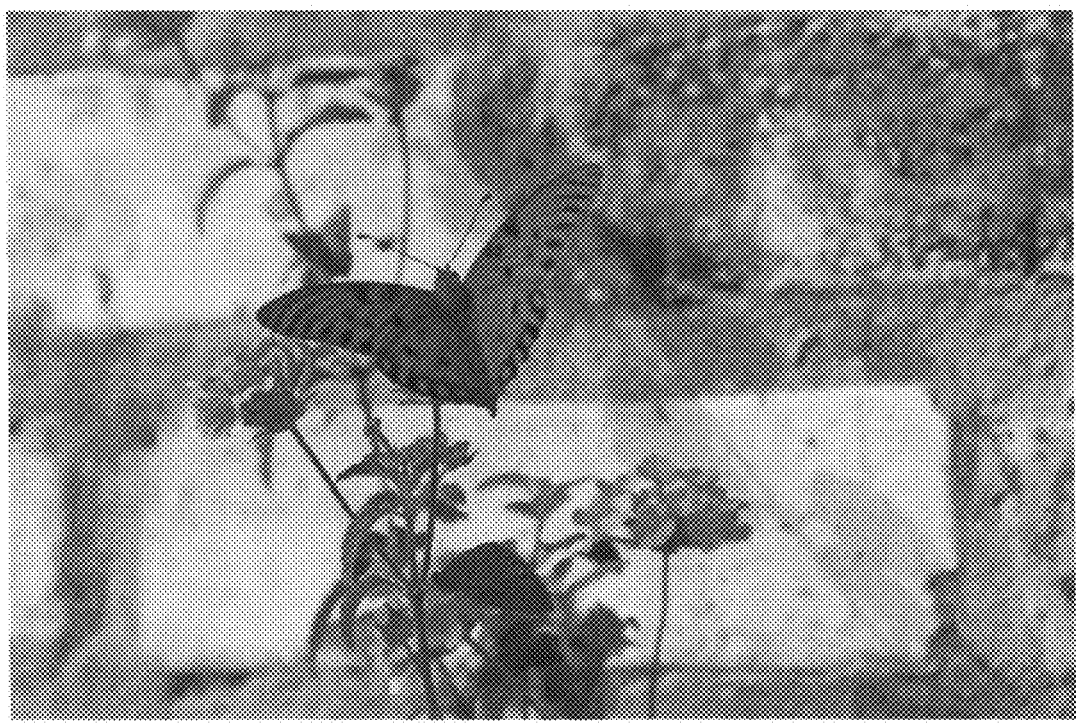
Figure 10:
FIGS. 10-15 provide further illustrations for depth map generation in accordance with an embodiment of the present disclosure.
Figure 10:

In FIG. 10, the same sample images from FIG. 7 are shown where high gradient points are highlighted. Specifically, the red blocks/regions shown in FIG. 10 represent blocks/regions having high gradient characteristics, where the high gradient blocks/regions may be determined, for example, according to a high frequency characteristic, a high variance characteristic, a high texture characteristic, and/or a high detail characteristic.

Figure 11:
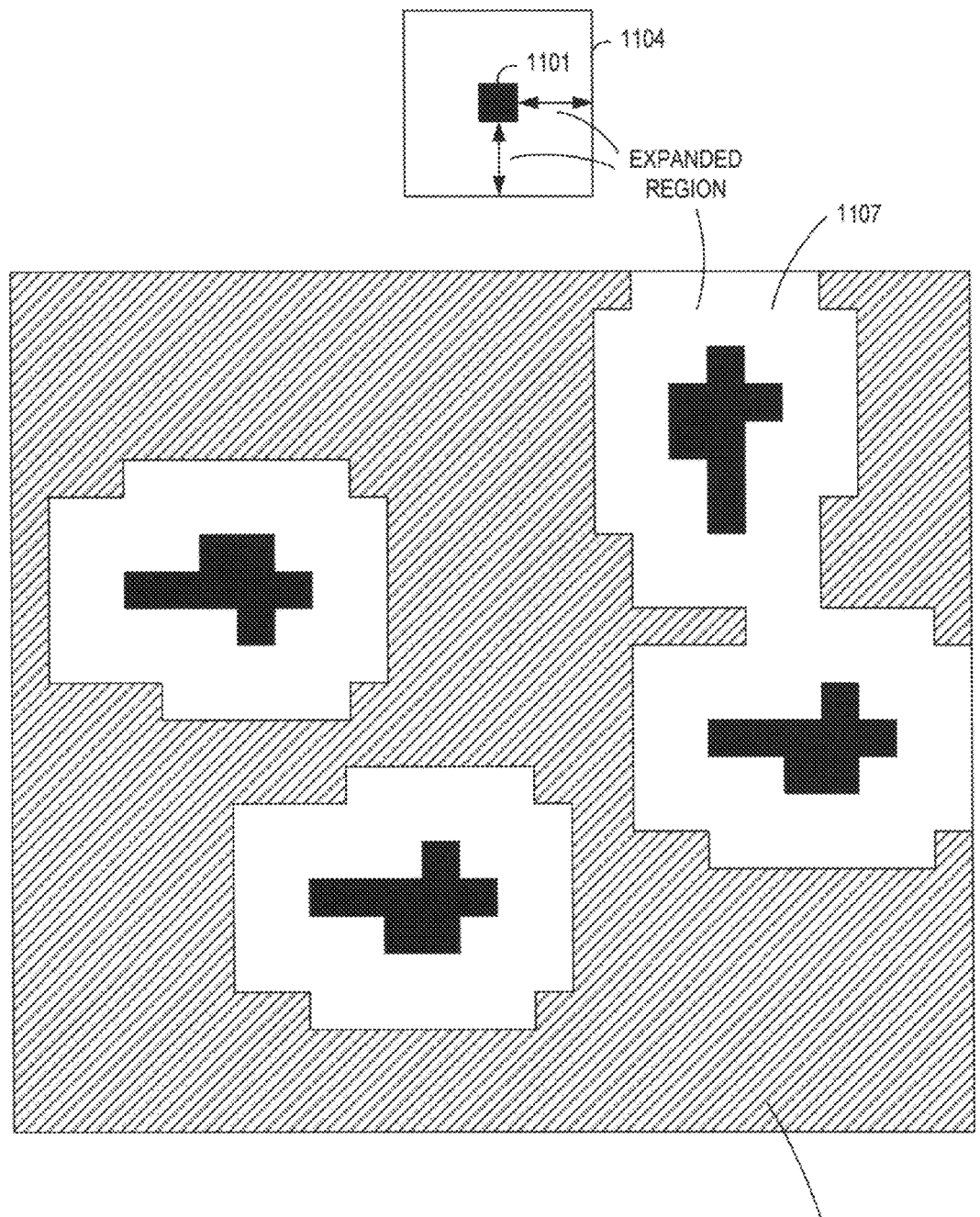

FIG. 11 illustrates the concept of forming an expanded high gradient region. For each high gradient region (i.e., the red dot blocks/regions depicted in FIG. 10), a buffer region is added to form an expanded high gradient region 1104 around each block. In the example shown, a buffer region is formed around each high gradient point 1101. Note that while a buffer region comprising a block is shown, arbitrary shapes for the buffer region may also be utilized. Furthermore, the size and/or shape of the buffer region may be determined as a function of the resolution of the image being processed and may vary such that any size and/or shape may be utilized. For example, as the resolution of the image increases, the size of the buffer region may increase accordingly.

Figure 12:
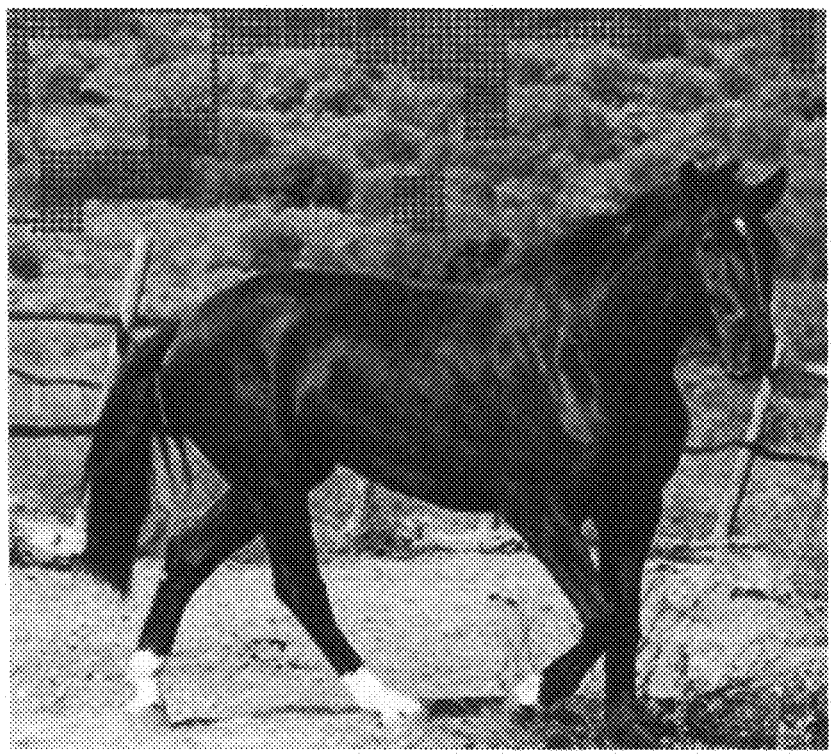
Figure 12:
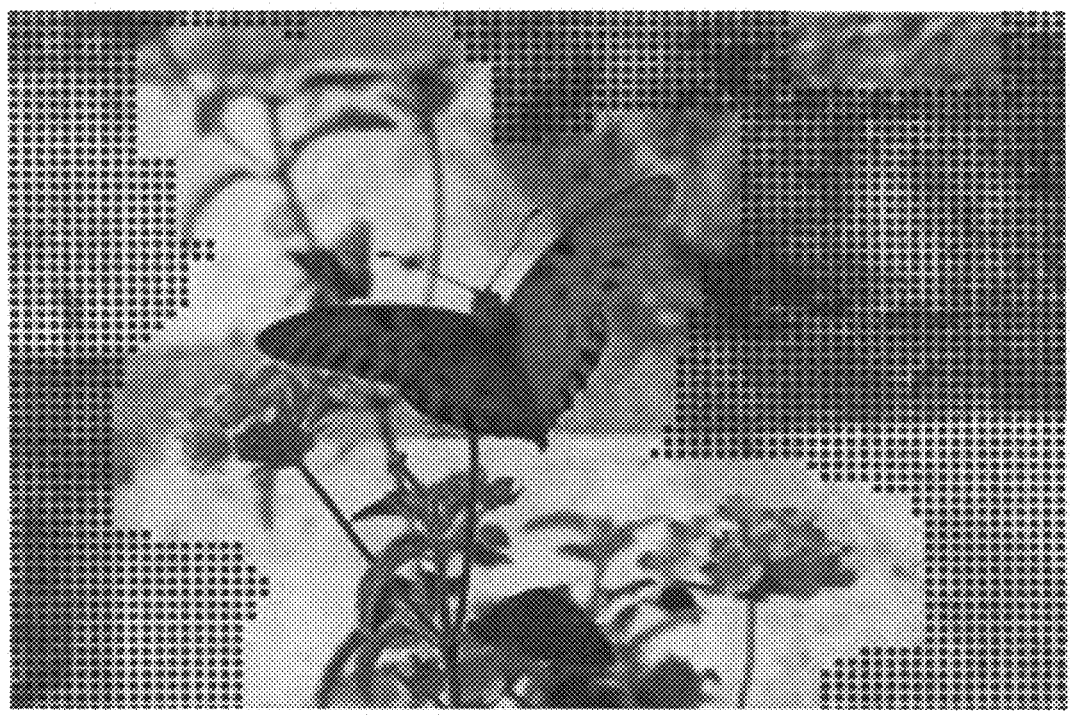

As described in more detail below, the region(s) within the image outside the expanded high gradient regions 1107 are determined to be the out-of-focus region. To further illustrate, reference is made to FIG. 12, which illustrates the expanded high gradient regions formed around each of the high gradient regions (i.e., the red blocks/regions depicted in FIG. 10). In FIG. 12, the purple regions represent areas outside the expanded high gradient regions. In accordance with various embodiments, these purple regions are collectively identified as the out-of-focus region, which are used for calibration of one or more color models for purposes of generating a depth map.

Figure 13:
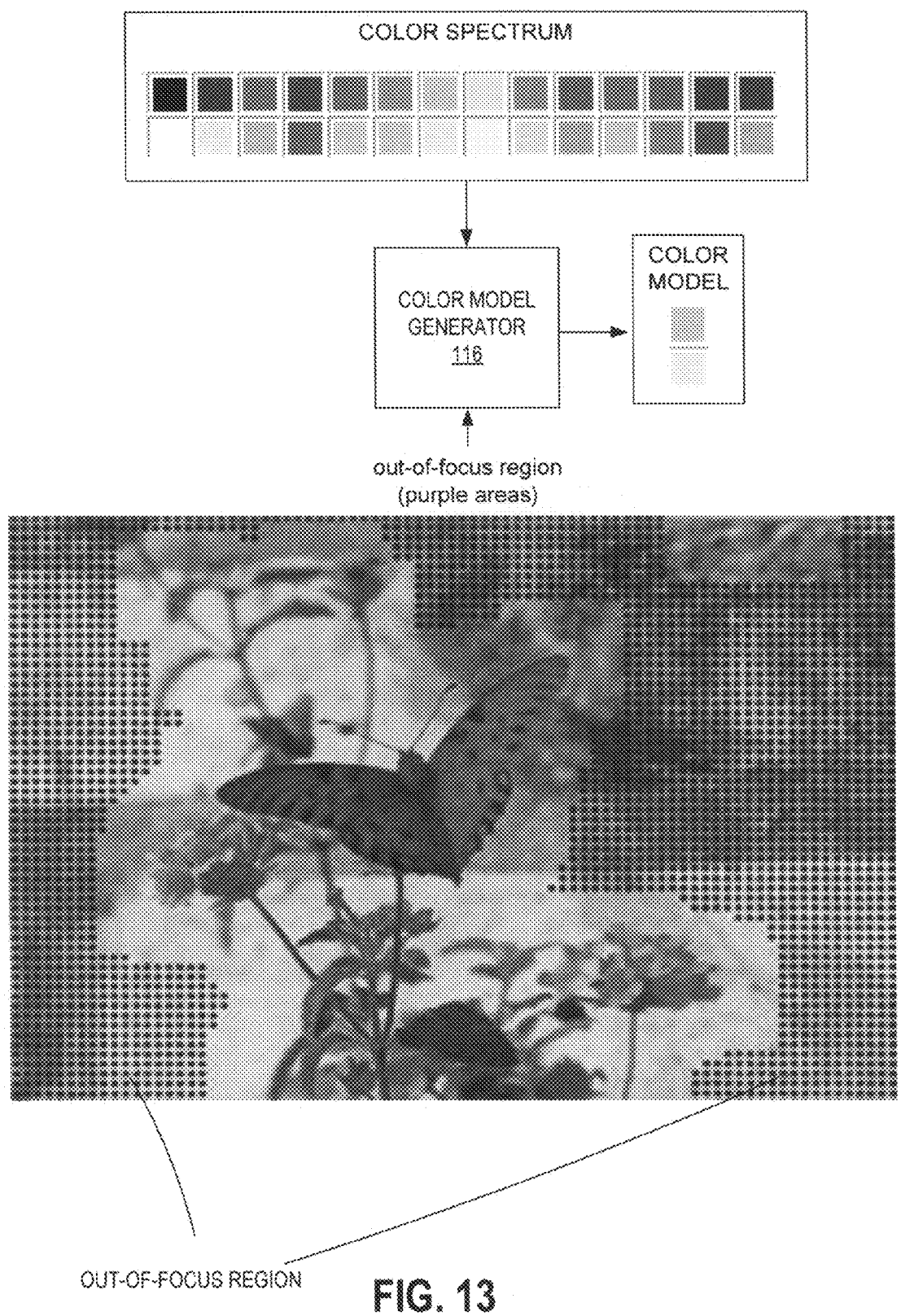

Reference is made to FIG. 13, which illustrates the calibration of a color model for assigning depth map values. As described earlier, the color model generator 116 is configured to analyze the out-of-focus region and determine the color spectrum of the out-of-focus region, wherein the out-of-focus region (shown in purple in the figure) is defined according to the expanded high gradient regions. The color model is calibrated to this region by the color model generator 116. For some embodiments, the color model generator 116 receives a color spectrum of the entire image and the out-of-focus region as inputs. Based on this, the color model generator 116 outputs a color model.

Figure 14:
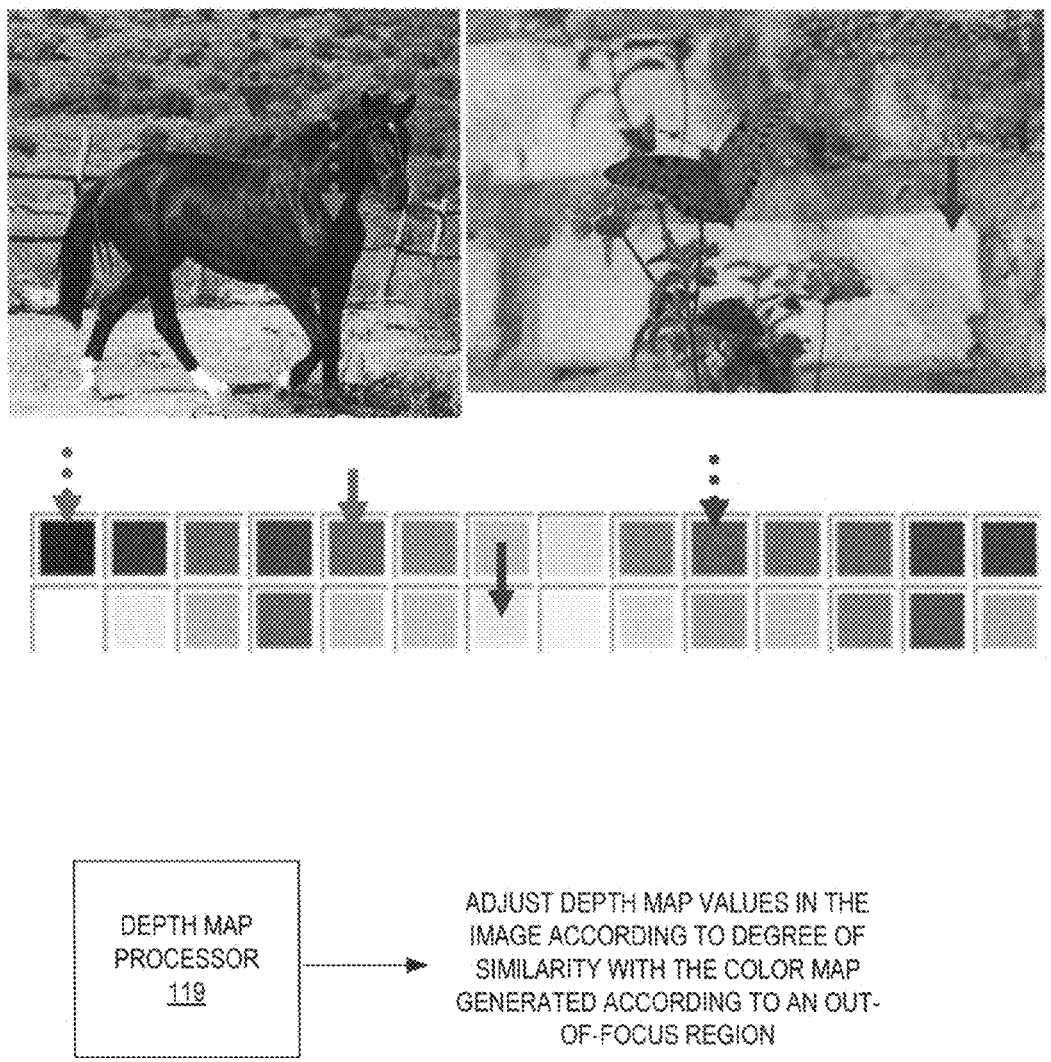

Turning now to FIG. 14, shown is an illustration of how the color model is calibrated according to the out-of-focus region. In the color model shown, the red arrows denote those colors that correspond to high gradient region(s), while the blue arrows represent those colors that correspond to the out-of-focus region. For example, in the image to the left, the blue arrow in the image is in the background and corresponds to the green colors in the color spectrum, where the dashed box corresponds to the color model used for assigning depth map values. Similarly, in the image to the right, the blue arrow corresponds to the background and corresponds to the yellow colors in the color spectrum shown. Again, the dashed box corresponds to the color model used for assigning depth map values. Based on the colors that correspond to the out-of-focus region, the depth map processor 119 compares each pixel in the images to the color model and assigns a corresponding depth map value.

Figure 15:
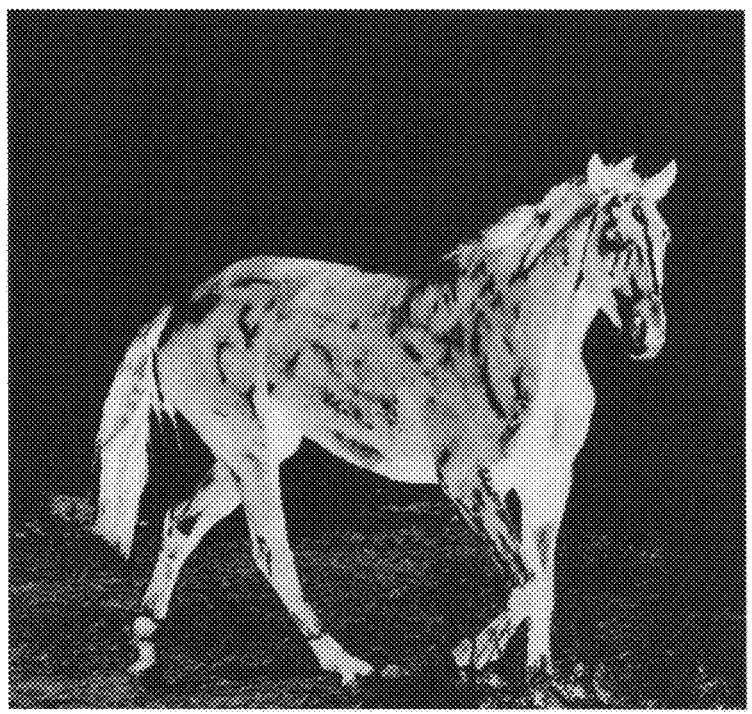
Figure 15:

For some embodiments, the depth map processor 119 determines whether a threshold degree of similarity exists between the current pixel and the color model. If the threshold degree of similarity exists, the depth map processor 119 assigns a relatively small depth map value to the current pixel because based on the high degree of similarity, the assumption is that the pixel is likely part of an out-of-focus region. If the threshold degree of similarity does not exist, the depth map processor 119 assigns a relatively high depth map value to the current pixel. Here, the assumption is that the pixel is likely part of a high gradient region. FIG. 15 depicts depth maps generated by the depth map processor 119 according to the color models calibrated based on out-of-focus region.

Figure 4:
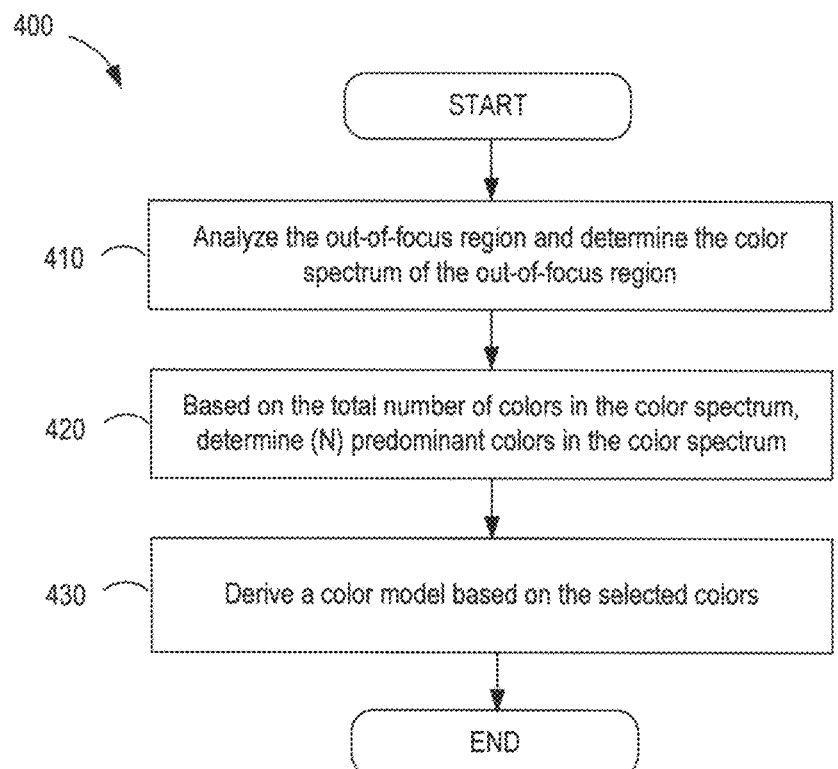
FIG. 4 illustrates an example of functionality implemented in the color model generator in the image processing system of FIG. 1 according to an embodiment of the present disclosure.

Reference is made to FIG. 4, which is a flowchart 400 in accordance with one embodiment for depth map generation. It is understood that the flowchart 400 of FIG. 4 provides merely an example of the many different types of functional arrangements that may be employed to implement the operation of the color model generator 116 (FIG. 1) in the image processing system 102 (FIG. 1). As an alternative, the flowchart of FIG. 4 may be viewed as depicting an example of steps of a method implemented in the image processing system 102 according to one or more embodiments.

Upon identifying an out-of-focus region 702 (FIG. 8), the image analyzer 114 forwards the identified out-of-focus region 702 to the color model generator 116 for further processing. Beginning with block 410, the color model generator 116 analyzes the out-of-focus region 702 selected by the image analyzer 114 and determines the color spectrum of the out-of-focus region 702, where the color spectrum represents the range of colors associated with pixels in the out-of-focus region 702. Note that the color spectrum/model is determined according to the out-of-focus region (collectively regions 702, 706) in an image. In this regard, the out-of-focus region comprises all region(s) other than the high gradient region(s). As discussed earlier, the "out-of-focus" region may refer to multiple areas within the image that are not necessarily contiguous.

In block 420, based on the total number of colors in the color spectrum, the color model generator 116 may be configured to identify a predetermined number of predominant colors in the color spectrum. For example, suppose the color model generator 116 determines that an out-of-focus region has a color spectrum that spans 45 different colors. The color model generator 116 may be configured to select the 10 primary or most predominant colors in the out-of-focus region. To further illustrate, suppose the color model generator 116 determines that the out-of-focus region exhibits 4 variations of the color orange. In this instance, the color model generator 116 may select a single set of color coordinates, for example, (255, 127, 0), to represent the 4 variations of orange with the color model.

In block 430, the color model generator 116 derives a color model based on the selected colors. Note that in some instances, all the colors in a given pixel block of the out-of-focus region (collectively regions 702, 706) may be allocated to the color model as well, particularly if the color variation is relatively low.

Figure 5:
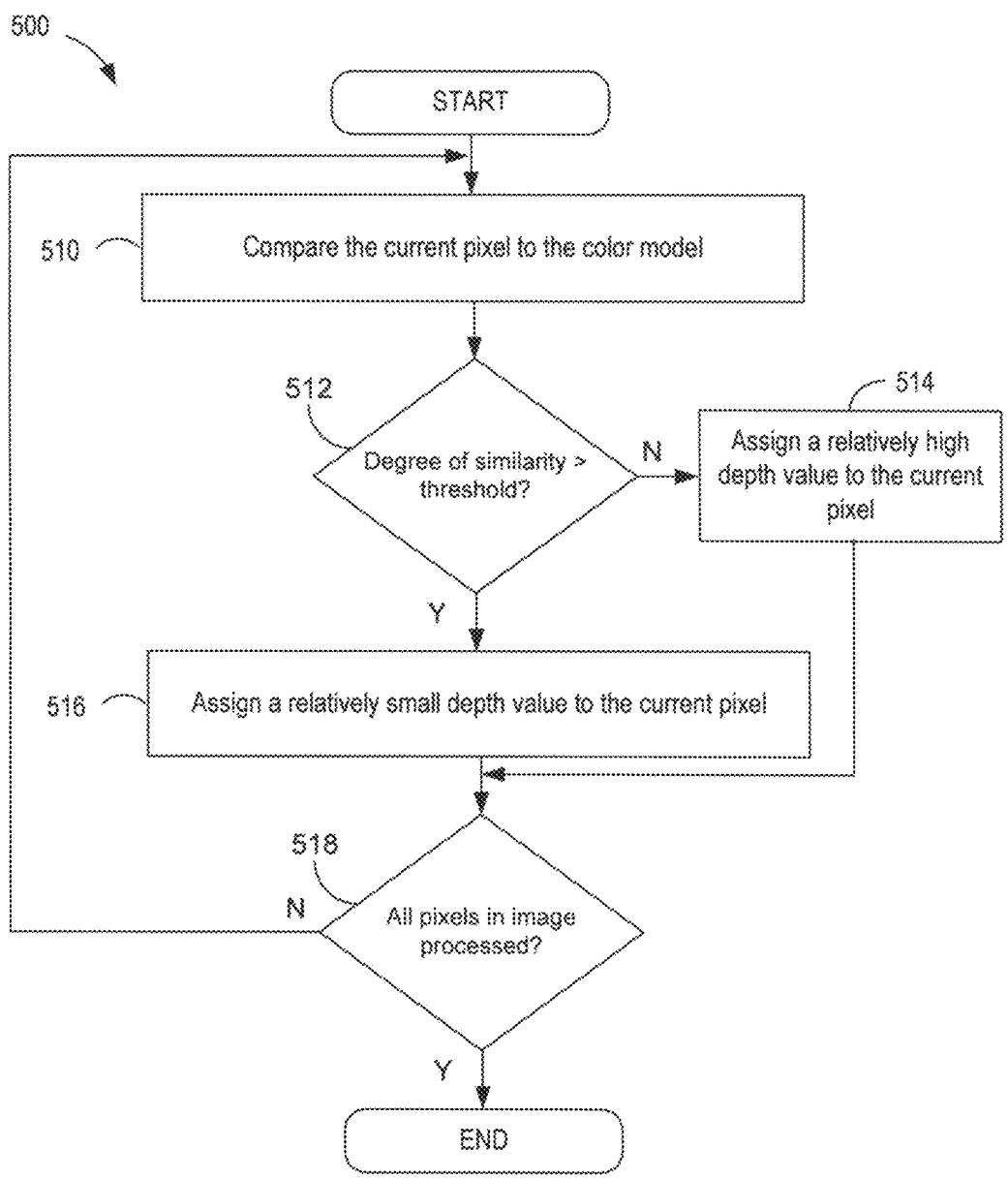
FIG. 5 illustrates an example of functionality implemented in the depth map processor in the image processing system of FIG. 1 according to an embodiment of the present disclosure.

Reference is made to FIG. 5, which is a flowchart 500 in accordance with one embodiment for depth map generation. It is understood that the flowchart 500 of FIG. 5 provides merely an example of the many different types of functional arrangements that may be employed to implement the operation of the depth map processor 119 (FIG. 1) in the image processing system 102 (FIG. 1). As an alternative, the flowchart of FIG. 5 may be viewed as depicting an example of steps of a method implemented in the image processing system 102 according to one or more embodiments.

The color model generator 116 forwards the color model generated according to the out-of-focus region (collectively regions 702, 706 in FIG. 8) to the depth map processor 119. Beginning with block 510, the depth map processor 119 compares each pixel in the retrieved image 115 (FIG. 1) to the colors in the color model. Referring back briefly to FIG. 8, suppose that regions 702, 706 are identified as the out-of-focus region. As shown, a corresponding color model 712 comprising colors C1 to C8 is derived by the color model generator 116 (FIG. 1).

Referring back to FIG. 5, the depth map processor 119 thus compare each pixel in the image 115 to determine a degree of similarity between the pixel and the color model 712 (FIG. 8). While an exact match is not necessary, the depth map processor 119 determines whether a close match exists between the current pixel and any of the colors in the color model 712. The depth map processor 119 may perform the comparison process based on, for example, RGB coordinates associated with the pixel and the color model 712.

In decision block 512, the depth map processor 119 determines whether a threshold degree of similarity exists between the current pixel and the color model 712. If the threshold degree of similarity exists, the depth map processor 119 proceeds to block 516 and a relatively small depth map value is assigned to the current pixel because based on the high degree of similarity, the assumption is made that the pixel is likely part of an out-of-focus region. If the threshold degree of similarity does not exist, the depth map processor 119 proceeds to block 514, where a relatively high depth map value is assigned to the current pixel. Here, the assumption is made that the pixel is likely part of a high gradient region.

In block 518, the depth map processor 119 determines whether all the pixels in the image 115 have been processed. If there are still pixels remaining in the image 115 that have not been processed, the depth map processor 119 proceeds back to block 510 and compares the next pixel to the color model 712.

Figure 6:
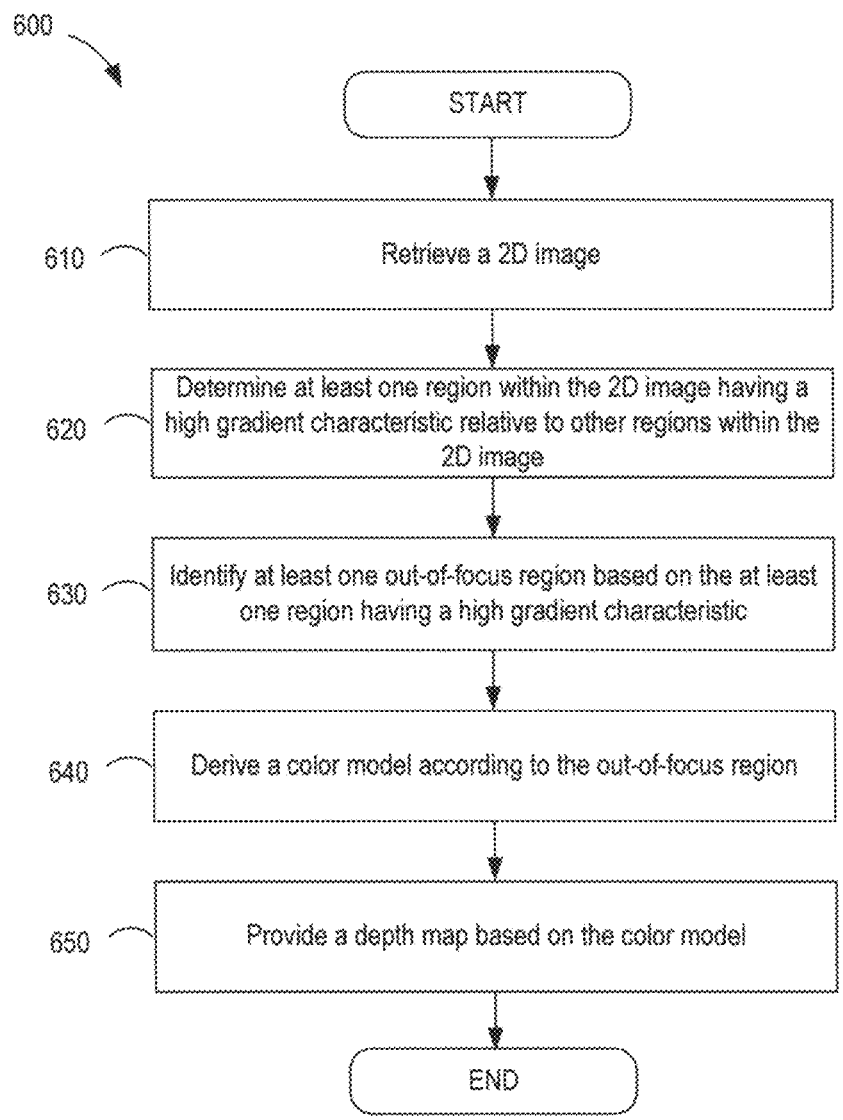
FIG. 6 is flowchart for generating a depth map implemented in the image processing system of FIG. 1 according to an embodiment of the present disclosure.

Having described the operation of various components in the image processing system 102 (FIG. 1), reference is made to FIG. 6, which is a flowchart 600 in accordance with one embodiment for the overall process of generating depth maps. It is understood that the flowchart 600 of FIG. 6 provides merely an example of the many different types of functional arrangements that may be employed to implement the overall operation of the image processing system 102. As an alternative, the flowchart of FIG. 6 may be viewed as depicting an example of steps of a method implemented in the image processing system 102 according to one or more embodiments.

Beginning with block 610, the image processing system 102 retrieves a 2D image 115 (FIG. 1). In block 620, the image processing system 102 determines at least one region within the 2D image 115 having a high gradient characteristic relative to other regions within the 2D image 115.

In block 630, the image processing system 102 identifies an out-of-focus region within the 2D image 115 from among regions other than the high gradient region. In block 640, the image processing system 102 derives a color model according to the out-of-focus region, and in block 650, the image processing system 102 provides a depth map based on the color model.

Note that the flowcharts of FIGS. 3-6 show examples of functionality of an implementation of portions of the image processing system 102. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above-described embodiments without departing from the principles of the present disclosure. All such modification sand variations are intended to be included herein within the scope of this disclosure and protected by the following claims.

At least the following is claimed:

1. A method implemented in an image processing device for performing two-dimensional (2D) to stereoscopic conversion, comprising:
    retrieving, by the image processing device, a 2D image;
    determining, by the image processing device, at least one region within the 2D image having a high gradient characteristic relative to other regions within the 2D image;
    identifying, by the image processing device, an out-of-focus region based on the at least one region having a high gradient characteristic;
    deriving, by the image processing device, a color model according to the out-of-focus region; and
    based on the color model, providing, by the image processing device, a depth map for 2D-to-stereoscopic conversion.

2. The method of claim 1, wherein providing the depth map for 2D-to-stereoscopic conversion based on the color model comprises determining, by the image processing device, a degree of similarity between each pixel in the 2D image and the color model.

3. The method of claim 2, wherein providing the depth map for 2D-to-stereoscopic conversion based on the color model further comprises assigning for each of the pixels, by the image processing device, a depth map value according to the degree of similarity associated each pixel.

4. The method of claim 3, wherein assigning for each of the pixels one of a low depth map value and a high depth map value according to the degree of similarity associated each pixel comprises:
    assigning a relatively lower depth map value responsive to a higher degree of similarity between the pixel and the color model; and
    assigning a relatively higher depth map value responsive to a lower degree of similarity between the pixel and the color model.

5. The method of claim 1, wherein the high gradient characteristic comprises one of:
    a high frequency characteristic;
    a high variance characteristic;
    a high texture characteristic; and
    a high detail characteristic.

6. The method of claim 1, wherein the region having the high gradient characteristic comprises an M-by-N pixel block.

7. The method of claim 1, wherein the region having the high gradient characteristic comprises an arbitrarily-shaped block.

8. The method of claim 1, wherein identifying, by the image processing device, an out-of-focus region based on the at least one region having the high gradient characteristic comprises:
    forming an expanded region around each of the at least one region having the high gradient characteristic; and
    determining the out-of-focus region in an area outside the at least one expanded region.

9. The method of claim 8, wherein forming an expanded region around each of the at least one region having the high gradient characteristic comprises forming an X-by-Y pixel block around each of the at least one region having the high gradient characteristic.

10. The method of claim 8, wherein forming an expanded region around each of the at least one region having the high gradient characteristic comprises forming a pixel block of a predetermined size and shape around each of the at least one region having the high gradient characteristic.

11. The method of claim 8, wherein forming an expanded region around each of the at least one region having the high gradient characteristic is performed according to a value quantifying a corresponding high gradient characteristic.

12. The method of claim 11, wherein forming the expanded region around each of the at least one region having the high gradient characteristic is performed according to an inverse relationship between a size of the expanded region and the value quantifying the corresponding high gradient characteristic associated with the at least one region having the high gradient characteristic.

13. The method of claim 8, wherein forming an expanded region around each of the at least one region having the high gradient characteristic is performed according to a resolution of the 2D image.

14. The method of claim 13, wherein a size of the expanded region increases as a resolution of the 2D image increases.

15. The method of claim 8, wherein prior to identifying an out-of-focus region based on the region having a high gradient characteristic further comprises applying a low pass filter to the 2D image.

16. The method of claim 1, wherein the color model represents a color spectrum of primary colors in the out-of-focus region.

17. The method of claim 1, wherein the color model corresponds to a predetermined number of predominant colors in the out-of-focus region.

18. The method of claim 1, wherein identifying the out-of-focus region is identified based on a differential value relative to the at least one region having the high gradient characteristic.

19. The method of claim 18, wherein the differential value relative to the at least one region having the high gradient characteristic comprises a distance within the 2D image from the at least one region having the high gradient characteristic.

20. The method of claim 18, wherein the differential value relative to the at least one region having the high gradient characteristic comprises a color value differential relative to the at least one region having the high gradient characteristic.

21. A method implemented in an image processing device for performing two-dimensional (2D) to stereoscopic conversion, comprising:
retrieving, by the image processing device, a 2D image;
determining, by the image processing device, at least one high gradient region within the 2D image having a high gradient characteristic relative to other regions within the 2D image, wherein the at least one high gradient region includes at least one of: a high frequency region, a high variance region, a high texture region, and a high detail region;
forming an expanded region around each of the at least one high gradient region;
identifying, by the image processing device, an out-of-focus region within the 2D image based on one or more regions other than the at least one expanded region;
deriving, by the image processing device, a color model according to the out-of-focus region; and
based on the color model, providing, by the image processing device, a depth map for 2D-to-stereoscopic conversion.

22. The method of claim 21, wherein forming an expanded region around each of the at least one high gradient region comprises forming a pixel block of a predetermined size and shape around each of the at least one high gradient region.

23. The method of claim 21, wherein forming an expanded region around each of the at least one region having the high gradient characteristic is performed according to a value quantifying a corresponding high gradient characteristic.

24. The method of claim 23, wherein forming the expanded region around each of the at least one region having the high gradient characteristic is performed according to an inverse relationship between a size of the expanded region and the value quantifying the corresponding high gradient characteristic associated with the at least one region having the high gradient characteristic.

25. The method of claim 21, wherein providing, by the image processing device, the depth map for 2D-to-stereoscopic conversion based on the color model comprises:
assigning a low depth map value for a pixel responsive to a high degree of similarity between the pixel and the color model; and
assigning a high depth map value for a pixel responsive to a low degree of similarity between the pixel and the color model,
wherein assigning depth map values is performed for each pixel in the 2D image.

26. A system for generating a depth map for two-dimensional (2D) to stereoscopic conversion, comprising:
an image processing device; and
an application executable in the image processing device, the application comprising:
logic that retrieves a 2D image;
logic that determines at least one high gradient region within the 2D image relative to other regions within the 2D image;
logic that determines an out-of-focus region within the 2D image based on the at least one high gradient region;
logic that derives a color model according to the out-of-focus region; and
logic that provides a depth map based on the color model.

27. The system of claim 26, wherein the high gradient region within the 2D image is determined according to a region exhibiting at least one of:
a high frequency characteristic;
a high variance characteristic;
a high texture characteristic; and
a high detail characteristic.

28. The system of claim 26, wherein the color model represents a predetermined number of predominant colors within the out-of-focus region.

29. The system of claim 26, wherein depth map values in the depth map are adjusted on a pixel level according to a degree of similarity between each pixel and the color model.

* * * * *